Patented Sept. 21, 1943

2,329,795

UNITED STATES PATENT OFFICE 2,329,795

MANUFACTURE OF HALOGENATED HYDROCARBONS

Herbert Muggleton Stanley, Tadworth, and Thomas Bruce Philip, Effingham, England, assignors to The Distillers Company Limited, Edinburgh, Scotland, a British company No Drawing. Application July 21, 1941, Serial No. 403,460. In Great Britain August 12, 1940

3 Claims. (Cl. 260—656)

The present invention relates to the production of halogenated hydrocarbons by the direct combination of acetylene and its homologues, with hydrogen halides, and particularly to the production of vinyl chloride from acetylene and gaseous hydrochloric acid.

It is known that acetylene and its homologues will combine with hydrogen halides at a raised temperature in the presence of catalysts, but as a general rule the reactions concerned are highly exothermic so that large amounts of heat have to be dissipated. This is particularly the case in the combination of acetylene with hydrochloric acid to form vinyl chloride in which the heat of reaction is about 30 kg. cal. per molecule.

It has been proposed to effect the combination in the presence of large amounts of inert diluents or in the presence of a large excess of acetylene but these methods have the disadvantage that the concentration of vinyl chloride in the products of reaction is low and difficulties are met with in separating it in a pure state. In another method of working, in order to avoid the excessive production of heat hereinbefore referred to, the reaction is carried out with low gas velocities, but this has the disadvantage that the throughput per unit of catalyst is very small.

It has now been found that the above disadvantages can be overcome and that pure products can be obtained at very high outputs per unit volume of catalyst by causing the hydrocarbon to react with the hydrogen halide in several stages with the following advantages:

Production of a gas mixture containing a very high concentration of vinyl chloride and only small amounts of unchanged acetylene or hydrogen chloride, such a mixture being very readily treated for the recovery of pure vinyl chloride without the use of complicated pressure or low-temperature plant.

The effective life of the catalyst is greatly increased in a multi-stage unit of the type envisaged.

Owing to the better temperature control rendered possible by a multi-stage operation, corrosion of mild steel equipment by hydrogen chloride is almost entirely eliminated, loss of mercuric chloride from the catalyst surface is minimised and the production of high boiling by-products is reduced to a negligible amount.

The vinyl chloride obtained by this process is almost free from higher boiling substances, such as ethylidene dichloride and after removal of excess acetylene and hydrogen chloride, is usually at least 99.5% pure.

According to the present invention acetylene and/or its homologues are caused to react at a raised temperature in the presence of a catalyst with an amount of hydrogen halide insufficient to combine with all the acetylenic hydrocarbon present, and the products of reaction are brought into contact with a further quantity of the hydrogen halide in one or more separate and successive operations. Preferably the reaction is carried out in a multiplicity of tubular reaction vessels maintained at a controlled temperature by any known means, for example by a boiling liquid bath.

A convenient method of carrying out the invention as applied to the production of vinyl chloride consists in passing a mixture of acetylene with approximately 33 per cent of the total amount of hydrochloric acid gas theoretically required to combine with the acetylene present, through a series of tubes packed with catalyst immersed in a boiling liquid bath maintained at a constant temperature, e. g. at a temperature between 100–140° C. by any known means, and in passing the issuing vapours through two more similar reaction vessels maintained at the same temperature, in each case approximately 33 per cent of the hydrochloric acid required to combine with the amount of acetylene originally taken being added to the vapours before their passage through the aforesaid reaction vessels.

Suitable catalysts comprise metal halides, particularly mercuric chloride, deposited on active carbon, silica gel, pumice or other porous carriers. Metal halides catalysts, particularly mercuric chloride catalysts, become less active after a period of use as part of the halide is entrained in vapour form by the hot gases.

A further feature of the present invention consists in the provision of an extra reaction chamber packed with catalyst but cooled to ordinary temperature, to serve as a condenser for the gaseous reaction products and to retain any entrained catalytic material.

As any entrained catalytic material will be carried forward in the direction of the gas flow, the catalytic activity of the first of the series of reaction vessels will become weakened first, and when this occurs the flow of gas can be reversed and the last reaction vessel, which has been used as a condenser, can be heated and used as the first reaction chamber, whereas the depleted reaction vessel can be cooled and used as a condenser. If desired, the operation can be carried out in more than the three stages hereinbefore referred to, making an appropriate division of the hydrogen halide added at each stage, and more than one reaction vessel may be maintained cold and used as condensers and subsequently used as reaction vessels as hereinbefore described.

By operating according to the process of the invention a high yield of products can be obtained in a continuous manner, and by using the supplementary reaction vessel as hereinbefore described, loss of catalytic activity due to volatilisation of the metal halide is avoided.

With regard to the life of the catalyst used in the vinyl chloride synthesis, it has been found that fouling of the catalyst occurs only to an appreciable extent where it is in contact with relatively high concentrations of vinyl chloride. When carrying out the process in such a way as to effect substantially complete conversion of acetylene into vinyl chloride, a slow deterioration of the catalyst takes place in that part of the catalyst which is in contact with relatively pure vinyl chloride. In a multi-stage unit, therefore, it is only the catalyst in the final stage or stages of the reaction system which needs to be revivified or replaced with fresh catalysts at certain intervals of time. The catalyst in the earlier stages of reaction has been found to have a very long life. On the other hand, in a single-stage reaction operated in such a way as to yield high concentrations of vinyl chloride in the gaseous products, the whole catalyst must be revivified or replaced when the conversion has fallen below the desired level. It is clear, therefore, that the multi-stage operation has definite advantages from the viewpoint of economy in catalyst.

*Example.*—The production of vinyl chloride was carried out over a prolonged period in a 3-stage reaction system, each stage consisting of a multi-tubular reaction vessel with a boiling liquid bath outside the tubes. The first two stages were operated with a liquid bath temperature of 100° C. while the third and final stage had a bath temperature of 130° C. Dry acetylene admixed with about 0.35 molecular proportion of dry hydrogen chloride was fed into the first reaction vessel and the hot gases issuing from this stage were admixed with a further 0.35 mol. of dry hydrogen chloride (calculated on the original acetylene feed) and passed through the second reaction vessel. After a further addition of about 0.35 molecular proportion of hydrogen, chloride (calculated, as before, on the acetylene feed), the hot gases were passed through the third reaction vessel, then cooled, washed with dilute alkali to remove the slight excess of hydrogen chloride, dried and the vinyl chloride recovered in pure form by physical means. In each of the reaction vessels, the rate of flow of the gases amounted to about 500–600 litres/hr. per litre of catalyst, the gaseous volume being reduced to N. T. P. The catalyst consisted of activated carbon impregnated with 15% by weight of mercuric chloride.

When this plant was operated continuously over long periods of time, it was found that the catalyst in the first and second stages had a very long useful life, amounting to thousands of hours. On the other hand, the catalyst in the third stage showed a gradual decline in activity so that the overall conversion fell slowly from 99% to about 90% in the course of about 1 month. The vinyl chloride produced contains less than 0.5% of higher-boiling products.

The multi-stage method of operation is also equally valuable where inert diluent gases or an excess of acetylene are present in the reaction gas. However in this case, the contact times are considerably longer than those necessary when using relatively pure acetylene and consequently larger volumes of catalyst are necessary for a given output of vinyl chloride. In addition, the resulting vinyl chloride was admixed with substantial proportions of inert gases and its recovery is rendered more difficult. On the other hand, the presence of inert gases in the reaction mixture reduces the partial pressure of the vinyl chloride and consequently reduces the rate of deterioration in catalyst activity.

What we claim is:

1. A process for the production of vinyl chloride which comprises passing a gaseous mixture of acetylene with a minor fraction of the stoichiometrically necessary amount of gaseous hydrogen chloride to form the vinyl chloride over a solid catalyst for the reaction at an elevated temperature, and thereafter adding the remainder of the said stoichiometrically necessary amount of gaseous hydrogen chloride to the resulting reaction mixture and passing the mixture over additional catalyst in at least one further separate and successive operation.

2. A process for the production of vinyl chloride comprising passing a gaseous mixture of acetylene with about one third of the stoichiometrically necessary amount of gaseous hydrogen chloride to form the vinyl chloride over a catalyst consisting of activated carbon impregnated with mercuric chloride maintained at an elevated temperature, thereafter adding further gaseous hydrogen chloride in the same amount and passing the mixture over a further batch of catalyst, finally adding the remainder of the stoichiometrically required gaseous hydrogen chloride and passing the mixture over a final batch of catalyst.

3. A process according to claim 2 wherein the completely reacted reaction products are passed through an extra reaction chamber cooled to ordinary temperature to act as a condenser and to retain any catalytic material entrained in the gaseous reaction products and the direction of flow of the reactants is periodically reversed said extra reaction chamber being heated to become the first reaction chamber and the first reaction chamber being cooled to function as the extra reaction chamber.

HERBERT MUGGLETON STANLEY.
THOMAS BRUCE PHILIP.